(12) United States Patent
Jin et al.

(10) Patent No.: US 7,478,658 B2
(45) Date of Patent: Jan. 20, 2009

(54) TIRE HAVING A CARCASS PLY TURN-UP PORTION WITH A CONCAVE SEGMENT

(75) Inventors: Jie Jin, Copley, OH (US); Richard Wright, Wadsworth, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 131 days.

(21) Appl. No.: 11/496,611

(22) Filed: Jul. 31, 2006

(65) Prior Publication Data

US 2008/0023119 A1 Jan. 31, 2008

(51) Int. Cl.
*B60C 15/00* (2006.01)
*B60C 15/06* (2006.01)

(52) U.S. Cl. ............... 152/539; 152/552; 152/554; 152/555

(58) Field of Classification Search ........... 152/548, 152/549, 550, 551, 552, 553, 554, 555
See application file for complete search history.

(56) References Cited

U.S. PATENT DOCUMENTS

| | | | |
|---|---|---|---|
| 3,557,860 A * | 1/1971 | Maiocchi | 152/541 |
| 3,703,203 A | 11/1972 | Simpson | |
| 3,736,973 A | 6/1973 | Mezzanotte et al. | |
| 3,982,579 A | 9/1976 | Mirtain | |
| 4,357,976 A | 11/1982 | Mezzanotte et al. | |
| 4,366,851 A | 1/1983 | Makino et al. | |
| 4,815,511 A | 3/1989 | Brayer et al. | |
| 5,236,031 A * | 8/1993 | Honbo et al. | 152/541 |
| 5,470,937 A | 11/1995 | Okamoto et al. | |
| 5,524,688 A | 6/1996 | Trares et al. | |
| 5,526,863 A | 6/1996 | Hodges | |
| 5,620,539 A * | 4/1997 | Ide | 152/541 |
| 5,622,576 A | 4/1997 | Lobb et al. | |
| 5,785,781 A | 7/1998 | Drieux et al. | |
| 6,026,878 A | 2/2000 | Zhang et al. | |
| 6,298,893 B1 | 10/2001 | Vannan et al. | |
| 6,866,734 B1 | 3/2005 | Ridha | |
| 2003/0041943 A1 | 3/2003 | Ueyoko | |

(Continued)

FOREIGN PATENT DOCUMENTS

JP  2001-219719  *  8/2001

OTHER PUBLICATIONS

Mechanics of Pneumatic Tires, US Department of Transportation, Aug. 1981 (p. 881).*

*Primary Examiner*—Justin Fischer
(74) *Attorney, Agent, or Firm*—Thomas R. Kingsbury; Steven M. Auvil

(57) ABSTRACT

A tire having a section height, a maximum section width, an upper section above the maximum section width, and a lower section below the maximum section width is provided. The tire includes a circumferential tread, a pair of sidewalls, a pair of bead regions each having a bead core, and at least one carcass ply extending circumferentially about the tire from one bead region to the other. The at least one carcass ply is wound outwardly about at least one of the bead cores and extends toward the tread to form a turn-up portion that terminates at a turn-up end. The turn-up portion includes a concave segment that begins in the bead region and ends short of the turn-up end or at the turn-up end.

8 Claims, 4 Drawing Sheets

U.S. PATENT DOCUMENTS

2004/0016495 A1* 1/2004 Serra et al. .................. 152/525
2004/0045653 A1 3/2004 Ueyoko
2004/0144470 A1 7/2004 Oare et al.

* cited by examiner

TIRE HAVING A CARCASS PLY TURN-UP PORTION WITH A CONCAVE SEGMENT

FIELD OF THE INVENTION

The present application relates to tires and, more particularly, to a tire having a carcass ply turn-up portion with a concave segment to improve lower sidewall performance of the tire.

BACKGROUND

In an inflated and loaded condition, a radial tire is subject to bending moments at the lower sidewall areas at the center of the tire footprint. The strains and stresses created by the moments are directly related to the lower sidewall performance of the tire.

Previous research and studies have demonstrated that increasing lower sidewall stiffness can reduce tire deformation in the region and improve lower sidewall performance. Because of the interaction between the wheel flange and tire contour in its mounting region, the lower sidewall of a rolling tire experiences high stress and strain cycles. Many engineering techniques and design methods have been developed to reduce stress and strain in the region.

SUMMARY

In one embodiment, a tire having a section height, a maximum section width, an upper section above the maximum section width, and a lower section below the maximum section width is provided. The tire includes a circumferential tread, a pair of sidewalls, a pair of bead regions each having a bead core, and at least one carcass ply extending circumferentially about the tire from one bead portion to the other. The at least one carcass ply is wound outwardly about at least one of the bead cores and extends toward the tread to form a turn-up portion that terminates at a turn-up end. In this embodiment, the turn-up portion has a height that is less than about 50% of the section height of the tire and includes a concave segment that extends from the bead region to the turn-up end.

In another embodiment, a tire having a section height is provided. The tire includes a circumferential tread, a pair of sidewalls, a pair of bead portions each having a bead core, and at least one carcass ply extending circumferentially about the tire from one bead portion to the other. The at least one carcass ply is wound outwardly about at least one of the bead cores and extends toward the tread to form a turn-up portion that terminates at a turn-up end. In this embodiment, a section of the turn-up portion follows a concave path that begins at a height of about 10 mm to about 20 mm and terminates at a height that is between about 20% to about 50% of the section height of the tire, wherein the heights are measured from the base of the bead core.

BRIEF DESCRIPTION OF DRAWINGS

The accompanying drawings, together with the detailed description provided below, describe exemplary embodiments of the claimed invention. In the drawings and description that follow, like elements are identified with the same reference numerals. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term. The examples are not intended to be limiting.

"Axial" or "axially" refer to a direction that is parallel to the axis of rotation of a tire.

"Circumferential" and "circumferentially" refer to a direction extending along the perimeter of the surface of the tread parallel to the equatorial plane perpendicular to the axial direction of the tire.

"Equatorial plane" refers to the plane that is perpendicular to the tire's axis of rotation and passes through the center of the tire's tread.

"Groove" refers to an elongated void in the tread of the tire that extends circumferentially in a straight, curved or zig-zag manner.

"Lateral" or "laterally" refer to a direction along the tread of the tire going from one sidewall of the tire to the other sidewall.

"Radial" or "radially" refer to a direction perpendicular to the axis of rotation of the tire.

"Sidewall" refers to that portion of the tire between the tread and the bead.

"Tread" refers to that portion of the tire that comes into contact with a surface under normal load.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
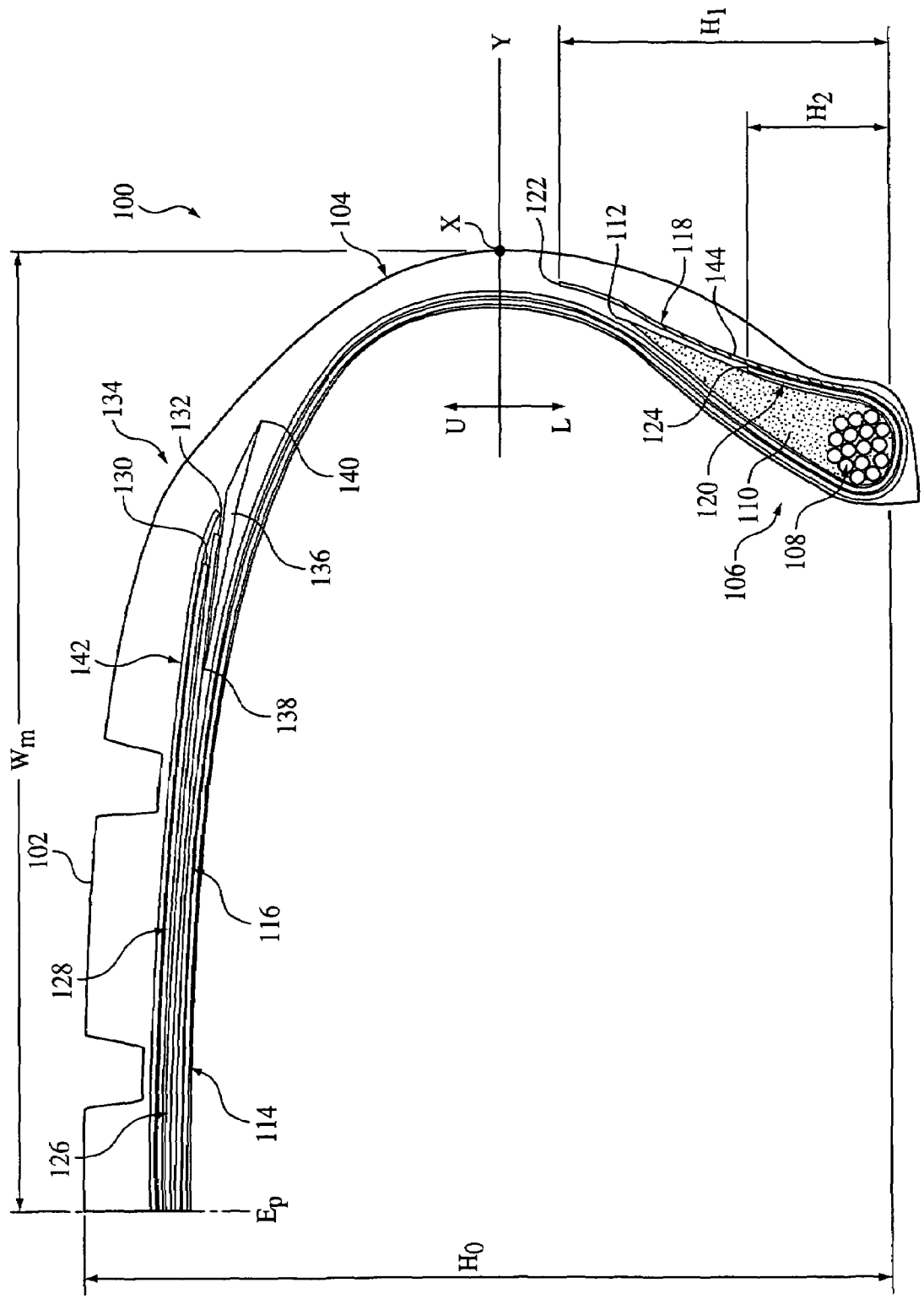
FIG. 1 is a cross-sectional view of one embodiment of half of a tire 100.

Illustrated in FIG. 1 is a cross-sectional view of half of one embodiment of a tire 100. Although only half of the tire 100 is depicted in the drawings, it will be appreciated that the other half of the tire 100 is a substantial mirror image of the half depicted. The tire 100 has an equatorial plane $E_p$ and one half of a maximum section width $W_m$ measured from the equatorial plane $E_p$ to the outer most point of the tire 100 (i.e., point X). The tire 100 can be divided into two sections—an upper section U and a lower section L. Separating the upper section U from the lower section L is a hypothetical line Y drawn through point X that is parallel to the axis of rotation of the tire 100. The upper section U is the portion of the tire 100 that is disposed above the hypothetical line Y with the maximum section width $W_m$ of the tire 100, while the lower section L is disposed below the hypothetical line Y with the maximum section width $W_m$ of the tire 100.

With continued reference to FIG. 1, the tire 100 includes a tread 102 provided in the upper section U of the tire 100, a sidewall 104 provided in both the upper and lower sections U, L of the tire 100, and a bead portion or region 106 provided in the lower section L of the tire 100. The bead portion 106 includes a bead core 108 and a bead filler 110 having an upper end 112.

The tire 100 further includes first and second carcass plies 114, 116 that extend circumferentially about the tire 100 from one bead region (e.g., bead region 106) to the other bead region (not shown). The first and second carcass plies 114, 116 are wound outwardly about the bead core 108 and extend upwardly towards the tread 102 to form first and second turn-up portions 118, 120, respectively, which will be discussed in further detail below. Each turn-up portion 118, 120 terminates at a turn-up end 122, 124, respectively. Although the tire 100 illustrated in FIG. 1 includes two carcass plies, the tire 100 can include a single carcass ply or more than two carcass plies in alternative embodiments (not shown).

In one embodiment, the first and second carcass plies 114, 116 include parallel-aligned cords that are radially disposed. In other words, the parallel-aligned cords are oriented substantially perpendicular to the equatorial plane $E_p$ of the tire 100. In alternative embodiments, one or more of the carcass plies can include parallel-aligned cords that are biased with respect to the equatorial plane $E_p$ of the tire 100. In all cases, the cords can be constructed of, for example, nylon or polyester or rayon.

With continued reference to FIG. 1, the tire 100 further includes first and second belts 126, 128 that extend circumferentially about the tire 100. The first and second belts 126, 128 are provided between the tread 102 and the first and second carcass plies 114, 116 as shown in FIG. 1. The first and second belts 126, 128 terminate at edges 130, 132, respectively, at a location near a shoulder region 134 of the tire 100. Although the tire 100 illustrated in FIG. 1 features two belts, the tire 100 can include a single belt or more than two belts in alternative embodiments (not shown).

In one embodiment, the first and second belts 126, 128 include parallel-aligned cords or wires that are radially disposed. In alternative embodiments, one or more of the belts can include parallel-aligned cords or wires that are biased with respect to the equatorial plane $E_p$ of the tire 100. In all cases, the cords or wires can be constructed of, for example, steel or other steel alloys.

With continued reference to FIG. 1, the tire 100 also includes a belt edge insert 136 provided in the shoulder region 134 of the tire 100 between the edges 130, 132 of the first and second belts 126, 128, respectively, and the first and second carcass plies 114, 116. The belt edge insert 136 has an inner end 138 and an outer end 140. The belt edge insert 136 is configured to protect the carcass plies 114, 116 from the edges of the belts 126, 128. The belt edge insert 136 may be constructed of extruded rubber or another elastomeric material. Although shown in the FIG. 1 embodiment, the belt edge insert 136 is optional and may be omitted in alternative embodiments (not shown).

The tire 100 further includes a tread cap 142 provided between the tread 102 and the first and second belts 126, 128. The tread cap 142 can be used to assist in holding the components of the tire together (e.g., the belts, plies, and tread). The tread cap 142 can include, for example, one or more polyester or nylon fabric plies. Although shown in the FIG. 1 embodiment, the tread cap 142 is optional and may be omitted in alternative embodiments (not shown).

With continued reference to the embodiment illustrated in FIG. 1, the first turn-up portion 118 of the first carcass ply 114 has a height Hi measured radially from the turn-up end 122 to the base of the bead core 108, while the second turn-up portion 120 of the second carcass ply 116 has a height $H_2$ measured radially from the turn-up end 124 to the base of the bead core 108. In the illustrated embodiment, $H_1$ is greater than $H_2$.

In one embodiment, the height $H_1$ of the first turn-up portion 118 is less than about 50% of the section height $H_0$ of the tire 100 (which is measured from the outer tread surface at the equatorial plane $E_p$ to the base of the bead core 108). In another embodiment, the height $H_1$ of the first turn-up portion 118 is between about 25% and about 50% of the section height $H_0$ of the tire 100. Preferably, the height $H_1$ of the first turn-up portion 118 is between about 40% and about 50% of the section height $H_0$ of the tire 100.

In one embodiment, the height $H_2$ of the second turn-up portion 120 can be less than about 35% of the section height $H_0$ of the tire 100. Preferably, the height $H_2$ of the second turn-up portion 120 is between about 10% and about 35% of the section height $H_0$ of the tire 100.

In the illustrated embodiment, the first turn-up portion 118 of the second carcass ply 114 includes a concave section or segment 144 that follows a concave path (hereinafter referred to as "concave segment 144"). For illustration purposes, the concave segment 144 of the turn-up portion 118 is hatched in order to differentiate it from the rest of the turn-up portion 118.

Figure 2:
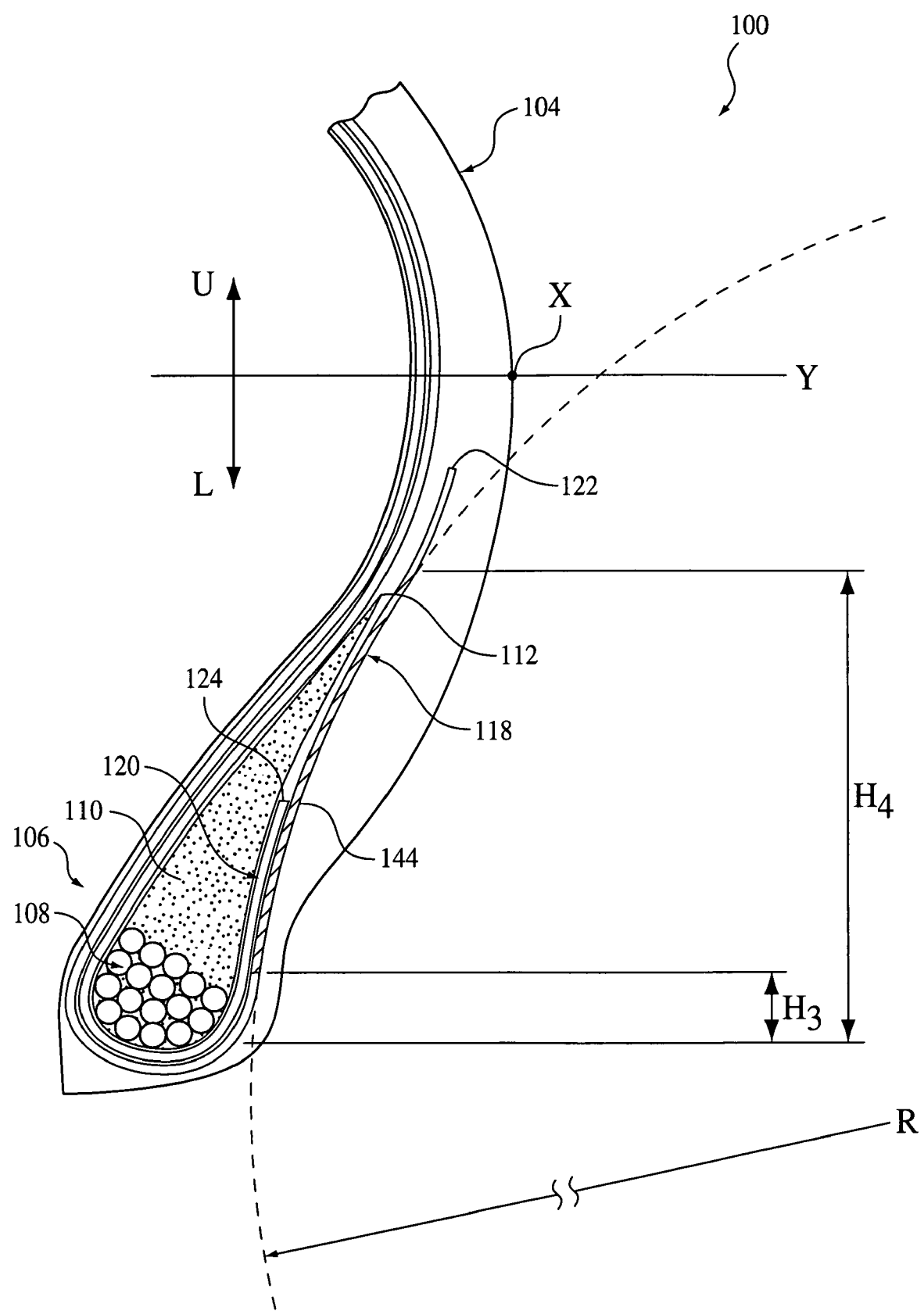
FIG. 2 is an enlarged perspective view of a portion of the tire 100 of FIG. 1.

Illustrated in FIG. 2 is an enlarged view of a portion of the tire 100 of FIG. 1 depicting the shape and orientation of the concave segment 144 of the first turn-up portion 118 in greater detail. As shown in FIG. 2, the concave segment 144 of the first turn-up portion 118 begins in the bead region 106 and terminates short of the first turn-up end 122 of the turn-up portion 118. Although the concave segment 144 of the first turn-up portion 118 in the illustrated embodiment terminates short of the second turn-up end 122 of the first turn-up portion 118, the first turn-up end 122 can terminate at the second turn-up end 122 of the first turn-up portion 118 in another embodiment (not shown).

The beginning and end of the concave segment 144 can also be discussed in terms of height relative to the base of the bead core 108. In one embodiment, the concave segment 144 of the first turn-up portion 118 can begin in the bead region 106 (e.g., at a height $H_3$ of about 10 mm to about 20 mm, preferably 15 mm) and terminate at a height (e.g., $H_4$) of between about 20% and about 50% of the section height $H_0$ of the tire 100. In another embodiment, the concave segment 144 can terminate at a height $H_4$ of between about 20% and 35% of the section height $H_0$ of the tire 100.

As shown in FIG. 2, the concave segment 144 of the first turn-up portion 118 follows a continuous concave path that is a portion of a circle (e.g., an arc) that is defined by a single radius R. In one embodiment, the radius R of the concave segment 144 is between about 380 mm and about 1500 mm. Preferably, the radius R of the concave segment 144 is between about 800 mm and about 1000 mm. In alternative embodiments (not shown), the concave segment 144 of the first turn-up portion 118 may follow a concave path that is defined by two or more radii with tangents (viewed in cross section) that work together to form a continuous surface. Moreover, in other embodiments (not shown), the concave segment 144 may be parabolic-shaped or may be defined by an irregular concave shape.

To force the concave segment 144 to follow the continuous concave path, the tire 100 can be constructed in at least three configurations.

Figure 3:
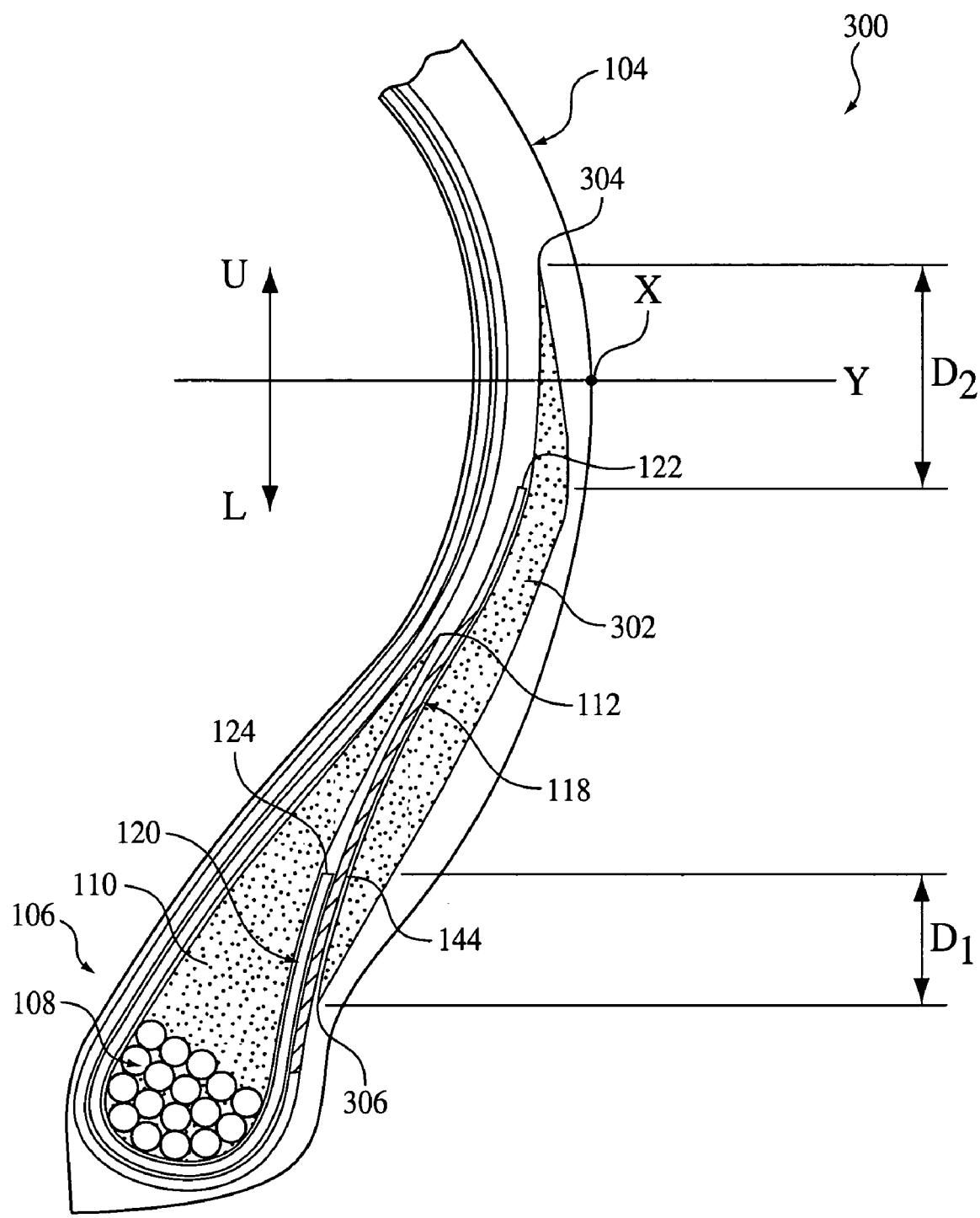
FIG. 3 is a cross-sectional view of another embodiment of half of a tire 300.

In one configuration, the tire can include an insert that is structured and arranged to assist, at least in part, in forming the concave segment 144 of the first turn-up portion 118. Illustrated in FIG. 3 is a cross-sectional view of another embodiment of half of a tire 300 depicting one embodiment of an insert 302 provided therein. The tire 300 is similar to and includes the same components as the tire 100, except that the tire 300 includes the insert 302. Although FIG. 3 illustrates only half of a cross-section of the tire 300, a second insert, similar to the insert 302 described above and illustrated in FIG. 3, can be provided in the other sidewall (not shown) of the tire 300.

With reference to FIG. 3, the insert 302 extends circumferentially about the tire 300, and includes an upper end 304 that terminates in the upper section U of the tire 300 and a lower end 306 that terminates in the lower section L of the tire 300. In another embodiment (not shown), the upper end 304 of the insert 302 can terminate in the lower section L of the tire 300.

In the illustrated embodiment, the insert 302 is positioned between the first turn-up portion 118 of the first carcass ply 114 and the sidewall 104 of the tire 300. In an embodiment where the tire 300 includes only one carcass ply (not shown), the insert 302 is provided between such carcass ply and the sidewall 104 of the tire 300.

As shown in FIG. 3, the lower end 306 of the insert 302 extends below the second turn-up end 124 of the second turn-up portion 120. In other words, the insert 302 overlaps the second turn-up portion 120. Preferably, the lower end 306 of the insert 302 extends below the second turn-up end 124 of the second turn-up portion 120 a radial distance $D_1$ between about 6 mm and about 12 mm.

Similarly, the upper end 304 of the insert 302 extends above the first turn-up end 122 of the first turn-up portion 118. Preferably, the upper end 304 of the insert 302 extends above the first turn-up end 122 of the first turn-up portion 118 a radial distance $D_2$ between about 6 mm and about 24 mm.

The insert 302 can be constructed from a variety of materials including, without limitation, an elastomeric material (e.g., rubber). In one embodiment, the insert 302 is constructed from an elastomeric material having a higher modulus of elasticity than the material from which the sidewall 104 is constructed.

The insert 302 described above and illustrated in FIG. 3 is configured to force the concave segment 144 to follow the continuous concave path discussed above. Due to its cross-sectional shape, construction, and position within the tire 300, the insert 302 is capable of forcing the first turn-up portion 118 inward, thereby defining, at least in part, the concave segment 144.

In a second configuration (not shown), the insert 302 described above and illustrated in FIG. 3 can be an extension of one or both sidewalls of the tire, instead of being a separate component. For example, the cross-sectional shape of the extruded rubber strips that form the sidewalls of the tire can be modified to take into account the extra material needed to cause the concave segment 144 to follow the concave path discussed above in a similar manner described above. In other words, each extruded strip can include a portion that replaces the insert 302 described above and illustrated in FIG. 3 (hereinafter referred to as "insert portion") in addition to the remaining portion that makes up the sidewall of the tire. In this configuration, the extruded rubber strips that form the sidewalls of the tire will be constructed of the same elastomeric material. However, in an alternative embodiment, the rubber strips that form the sidewalls of the tire may be constructed of two or more different materials made in a co-extrusion process. In this alternative embodiment, the insert portion of each rubber strip can be made of an elastomeric material having a higher modulus of elasticity than the remaining portion that makes up the sidewall of the tire.

Figure 4:
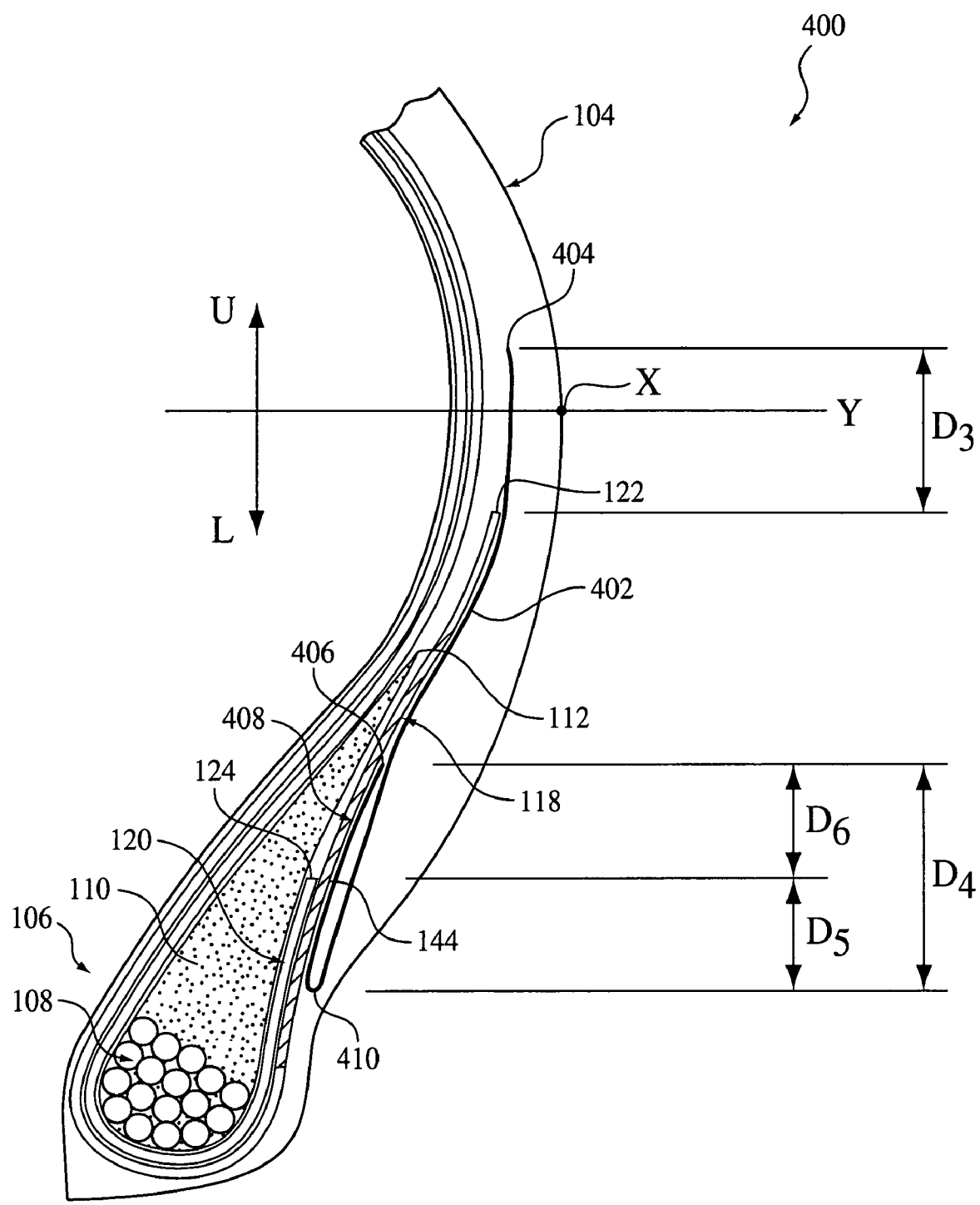
FIG. 4 is a cross-sectional view of another embodiment of half of a tire 400.

In a third configuration, the tire can include a reinforcement ply that is structured and arranged to assist, at least in part, in forming the concave segment 144 of the first turn-up portion 118. Illustrated in FIG. 4 is a cross-sectional view of another embodiment of half of a tire 400 depicting one embodiment of an reinforcement ply 402 provided therein. The tire 400 is similar to and includes the same components as the tire 100, except that the tire 400 includes the reinforcement ply 402. Although the tire 400 features a single reinforcement ply 402, two or more reinforcement plies can be employed in alternative embodiments (not shown). Moreover, although FIG. 4 illustrates only half of a cross-section of the tire 400, a second reinforcement ply, similar to the reinforcement ply 402 described above and illustrated in FIG. 4, can be provided in the other sidewall (not shown) of the tire 400.

The reinforcement ply 402 extends circumferentially about the tire 400 and is provided between the first turn-up portion 118 and the sidewall 104 of the tire 400. In an embodiment where the tire 400 includes only one carcass ply (not shown), the reinforcement ply 402 is provided between the single carcass ply and the sidewall 104 of the tire 400.

As shown in FIG. 4, the reinforcement ply 402 includes an upper edge 404 that terminates in the upper section U of the tire 400 and a lower edge 406 that terminates in a lower section L of the tire 400. In another embodiment (not shown), the upper edge 404 of the reinforcement ply 402 can terminate in the lower section L of the tire 400.

With reference to FIG. 4, the upper edge 404 of the reinforcement ply 402 extends beyond the first turn-up end 122 of the first turn-up portion 118. Preferably, the upper edge 404 of the reinforcement ply 402 extends beyond the first turn-up end 122 of the first turn-up portion 118 a radial distance $D_3$ between about 6 mm and about 24 mm.

In the illustrated embodiment, the lower edge 406 of the reinforcement ply 402 is folded up towards the tread 102 of the tire 400, thereby forming a fold-up portion 408 and a crease 410. The fold-up portion 408 cooperates with the adjacent portion of the reinforcement ply 402 from which it overlaps to form a dual layer reinforcement. Preferably, the radial distance $D_4$ between the crease 410 and the end of the fold-up portion 408 of the reinforcement ply 402 (i.e., the lower edge 406) is between about 6 mm and about 24 mm. The extent of the fold can also be discussed in relation to fold percentage (i.e., the relationship between the length of the fold-up portion 408 of the reinforcement ply 402 and the length of the remaining portion of the reinforcement ply 402 defined between the crease 410 and the upper edge 404 of the reinforcement ply 402). Preferably, the fold-up portion 408 can have a fold percentage between about 25% and about 50%. In another embodiment (not shown), the folded reinforcement ply 402 can be replaced with two or more separate pieces of ply material cut to different lengths.

With continued reference to FIG. 4, the crease 410 of the reinforcement ply 402 extends below the second turn-up end 124 of the second turn-up portion 120. Preferably, the crease 410 of the reinforcement ply 402 extends below the second turn-up end 124 of the second turn-up portion 120 a radial distance $D_5$ between about 6 mm and about 12 mm.

Additionally, the lower edge 406 of the reinforcement ply 402 extends above the second turn-up end 124 of the second turn-up portion 120. Preferably, the lower edge 406 of the reinforcement ply 402 extends beyond the second turn-up end 124 of the second turn-up portion 120 a radial distance $D_6$ between about 6 mm and about 12 mm.

The reinforcement ply 402 is constructed of a set of parallel-aligned cords encapsulated in rubber or another elastomeric material. In one embodiment, the set of parallel-aligned cords are radially disposed. In other words, the parallel-aligned cords are oriented substantially perpendicular to the equatorial plane $E_p$ of the tire 400. In alternative embodiments, the reinforcement ply 402 can include parallel-aligned cords that are biased with respect to the equatorial plane $E_p$ of the tire 400. In all cases, the cords can be constructed of, for example, nylon or polyester.

In one embodiment, the reinforcement ply 402 has a thickness between about 0.5 mm and about 1.0 mm. Preferably, the reinforcement ply 402 has a thickness of about 0.9 mm.

The reinforcement ply 402 described above and illustrated in FIG. 4 is configured to force the concave segment 144 to follow the continuous concave path discussed above. Due to its construction and position within the tire 400, the reinforcement ply 402 (specifically the fold-up portion 408 and the adjacent portion of the reinforcement ply 402 from which it overlaps) is capable of forcing the first turn-up portion 118 inward, thereby defining, at least in part, the concave segment 144.

By providing a tire that includes a carcass ply turn-up portion having a concave segment similar to the one discussed above, sidewall performance of the tire can be improved. Specifically, the existence of the concave segment in the carcass ply turn-up portion can reduce lower sidewall strain energy density. Reduction of strain energy density in the lower sidewall region of the tire can lead to an improvement in durability (e.g., a reduction of possible separation between the sidewall and the bodyply of the tire), a reduction of deflection of the sidewall, and/or an improvement in vehicle handling.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" is employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto."

While the present application illustrates various embodiments, and while these embodiments have been described in some detail, it is not the intention of the applicant to restrict or in any way limit the scope of the claimed invention to such detail. Departures may be made from such details without departing from the spirit or scope of the applicant's claimed invention. Therefore, the invention, in its broader aspects, is not limited to the specific details, the representative apparatus, and illustrative examples shown and described.

The invention claimed is:

1. A tire having a section height, a maximum section width, an upper section above the maximum section width, and a lower section below the maximum section width, the tire comprising:
    a circumferential tread;
    a pair of sidewalls;
    a pair of bead regions, each having a bead core;
    at least one carcass ply extending circumferentially about the tire from one bead region to the other, wherein the at least one carcass ply is wound outwardly about at least one of the bead cores and extends toward the tread to form a turn-up portion that terminates at a turn-up end, wherein the turn-up portion has a height that is less than about 50% of the section height of the tire, wherein the turn-up portion includes a concave segment that extends from the bead region to the turn-up end; and
    at least one reinforcement ply extending circumferentially about the tire and provided between the turn-up portion and one of the sidewalls, wherein a lower edge of the at least one reinforcement ply terminates in the lower section of the tire and an upper edge of the at least one reinforcement ply terminates in the upper section of the tire;
    wherein the at least one reinforcement ply includes a fold-up portion and a crease.

2. The tire of claim 1, wherein the turn-up portion has a height that is between about 25% and about 50% of the section height of the tire.

3. The tire of claim 1, wherein the concave segment of the turn-up portion has a radius between about 380 mm to about 1500 mm.

4. The tire of claim 1, further comprising a second carcass ply wound outwardly about the bead core and extends toward the tread to form a second turn-up portion that terminates at a second turn-up end, wherein the second turn-up portion has a height that is less than about 35% of the section height of the tire.

5. The tire of claim 1, wherein the crease of the at least one reinforcement ply extends below the turn-up portion.

6. The tire of claim 1, wherein the at least one reinforcement ply includes cords constructed of nylon.

7. The tire of claim 1, wherein a lower edge of the reinforcement ply is folded up towards the tread of the tire at a fold percentage of between about 25% and 50%.

8. The tire of claim 1, wherein the reinforcement ply includes cords constructed of nylon.

\* \* \* \* \*